Oct. 30, 1928.                                                    1,689,730
C. Y. KNIGHT
ADJUSTABLE TRANSMISSION GEAR
Filed Aug. 21, 1925
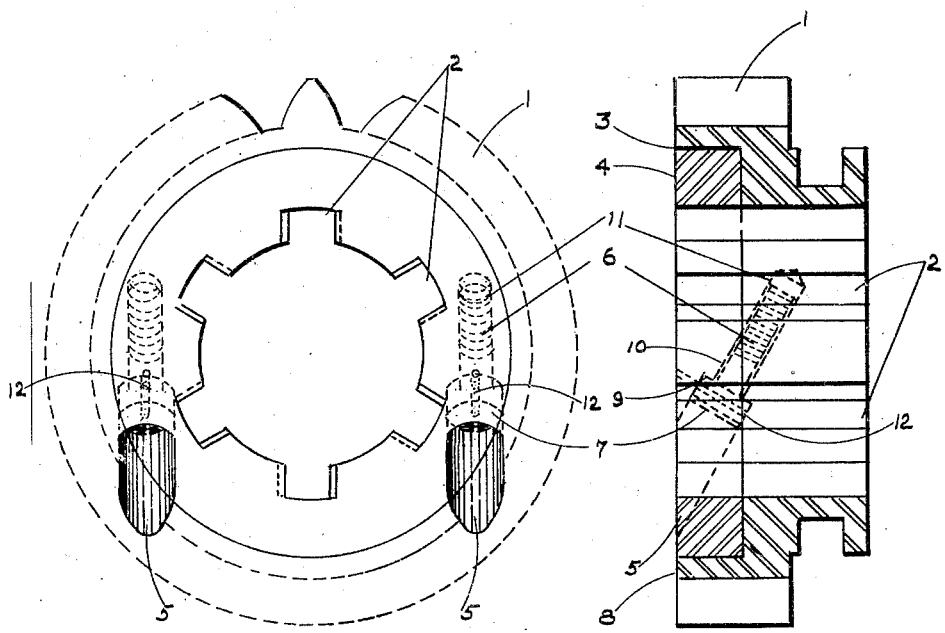
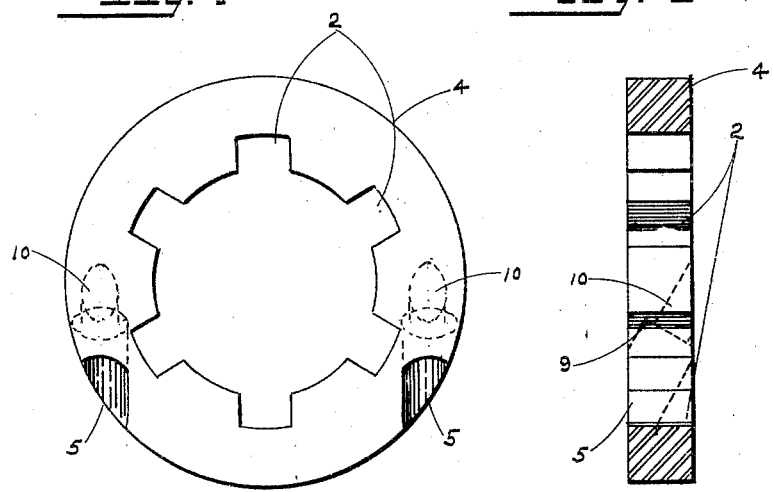
INVENTOR.
CHARLES Y. KNIGHT
BY
ATTORNEY.

Patented Oct. 30, 1928.

1,689,730

UNITED STATES PATENT OFFICE.

CHARLES Y. KNIGHT, OF PASADENA, CALIFORNIA, ASSIGNOR TO THE WILLYS-OVERLAND COMPANY, OF TOLEDO, OHIO, A CORPORATION OF OHIO.

ADJUSTABLE TRANSMISSION GEAR.

Application filed August 21, 1925. Serial No. 51,545.

This invention relates to power transmission gears, and more particularly to gears of the sliding type such as are ordinarily used in motor vehicle transmissions.

One of the objects of this invention is to provide a gear that will freely slide on a driving shaft.

Another object of the invention is to provide a gear that will freely slide on a driving shaft with a minimum amount of rotary freedom or backlash.

Another object of the invention is to provide a gear that has an adjustment for reducing backlash.

Another object of the invention is to provide a composite gear of the sliding type that has a convenient adjustment for backlash and which may be removed as a unit from the driving shaft.

A further object of the invention is to provide a gear of the sliding type that has an adjustment for backlash that may be locked in a predetermined position.

Other objects relating to details of construction and economies of manufacture, will appear from the description to follow, covering certain embodiments of the invention, which, for the purposes of the present application, I have illustrated in the accompanying drawings, in which:

Figure I is a front elevation showing an assembled composite gear embodying one form of the invention.

Fig. II is a sectional side elevation of the assembled gear.

Fig. III is a front elevation of the inner gear member.

Fig. IV is a sectional side elevation of the inner gear member.

Referring to the drawings in which the same numerals denote the same parts throughout the several views, 1 is the outer or toothed member of the gear having grooves 2 adapted to engage splines on a driving shaft (not shown) whereby the gear may be rotated and permitted to slide in an axial direction. Toothed member 1 is preferably recessed at 3 for receiving inner member 4 which has grooves 2 similar to those in member 1, the grooves being adapted to be substantially aligned with the grooves of outer member 1 for engaging tongues or splines on the driving shaft (not shown).

In each side of the exposed face 8 of the composite gear shown in Figs. I and II, is provided a hole 5 for the reception of the head 7 of a screw 6. In member 4, at a depth sufficient to permit the screw heads to clear the gear face 8, these holes 5 are reduced in diameter forming shoulders 9 against which the heads of screws 6 bear. Holes 5 and the reduced portions 10 are large enough to permit some movement of the screws 6 within the holes and are substantially in alignment with threaded holes 11 formed in the outer member 1. Holes 5 and 11 are drilled at an angle with the face of the gear so that a tightening of one of the screws 6 will both rotate the members relatively to each other and force them in an axial direction toward each other.

Sliding gears are well known in the art and prior to this invention, extreme care was necessary to obtain accurate fits of the gears upon the driving shaft. Tight fits make the gears difficult to slide and loose fits produce objectionable noise, the desired fit being somewhere between the two and involving considerable expense in its production.

The composite gear herein described may be produced with little attention to the fit of the gear on the shaft splines as the backlash may be reduced to the desired amount by the following method.

The assembled gear unit, as illustrated in Figure I, with the grooves 2 of its inner and outer members aligned, is slid upon a splined shaft (not shown), after which, one of screws 6 is loosened and the other screw 6 tightened. Tightening one of the screws slightly rotates the inner and outer members in opposite directions so that the grooves are relatively displaced, and the effective width of each complete groove in the composite gear is reduced. The necessary adjustment is very slight. In automobile transmissions, for which the device is primarily intended, the relative rotation of the two members of the gear in many cases may not be more than one or two thousandths of an inch. After the gear has been adjusted to the desired fit upon the shaft the remaining screw is tightened which locks the gear members as a unit by tending to rotate them in the reverse direction from the movement produced by the tightening of the first mentioned screw. The angular position of the screws forces the members 1 and 4 toward each other and prevents axial movement of the members with respect to each other. After screws 6 are tightened with the gear in the desired adjustment, they may be permanently locked in position by any suitable method such as drilling into screw head 7 by means of hole 12 provided in inner member 4 and then driving a tight fitting pin through hole 12 into screw head 7. It should be understood that in fitting the gear to its spline shaft, the relative rotation of the gear parts by means of the screw adjustment must be in the direction to bring the comparatively long groove walls of member 1 against those sides of the splines of the driving shaft which deliver power to the gear in the normal operation of the machine, the shorter groove walls of member 4 being relied upon only to take the force which tends to produce back-lash.

While I have shown somewhat in detail a specific embodiment of my invention, it is understood that this showing and description are illustrative only, and that I do not regard the invention as limited to the details of construction illustrated and described, except in so far as I have included such limitations within the terms of the following claims, in which it is my intention to claim all novelty inherent in the invention broadly as well as specifically.

I claim:

1. In a composite gear adapted to slide upon a driving shaft, the combination of a pair of relatively rotatable members, each of said members having portions adapted to operatively engage said shaft, means for rotating the members relative to each other and means for locking the members together as a slidable unit upon a shaft in a fixed angular relation.

2. In a composite gear adapted to slide upon a driving shaft, the combination of a pair of relatively rotatable members, each of said members having portions adapted to operatively engage said shaft, means for rotating said members relative to each other, and locking means for holding said members in a fixed angular relation, said locking means and said rotative means both tending to draw the members together in a direction parallel to the axis of said shaft.

3. In a transmission gear adapted to slide upon a driving shaft, the combination of a pair of relatively rotatable members, each of said members having means adapted to operatively engage said shaft, one of said members having an aperture therein and the other of said members having a threaded opening therein, a screw adapted to freely turn in the aperture and engage the threaded opening of the other member whereby said members may be relatively rotated, and means for locking the members against relative movement, in slidable relation to a shaft.

4. In a composite gear adapted to slide upon a driving shaft, the combination of a member adapted to operatively engage said shaft, said member adapted to have a limited amount of angular freedom with respect to the axis of said shaft, a second member adapted to restrict the angular freedom of said first mentioned member and means whereby said first and second members may be clamped together as a slidable unit.

5. In a gear adapted to slide upon a driving shaft the combination of a gear member having driving grooves adapted to engage splines on said shaft, a second member having similar grooves adapted to engage said splines, both of said members being adapted to be positioned on the shaft with aligned grooves, means for moving said members in a manner to angularly displace said grooves with respect to each other and said means coacting with each of said members for clamping them together as a slidable unit.

6. In a composite gear adapted to slide upon a driving shaft, the combination of a member having grooves adapted to engage said shaft, said member having a recess formed in one of its faces, a second member having grooves adapted to engage said shaft and rotatably positioned within said recess, means for holding said members in a fixed angular relation and said means adapted to clamp said members together as a slidable unit.

7. In a gear adapted to slide upon a driving shaft the combination of a member adapted to have free longitudinal movement on said shaft and a limited amount of rotary movement thereon, means for restricting the amount of rotary movement and means for locking the gear parts as a unit whereby a predetermined amount of rotary movement is maintained.

8. In a composite gear adapted to slide upon a driving shaft, the combination of a pair of shaft engaging members, means for angularly moving said members relative to each other, clamping means for holding said members together as a unit, and locking means for said clamping means.

9. In a composite gear adapted to slide upon a driving shaft, the combination of a pair of shaft engaging members, means for angularly adjusting the relative position of the members and means for clamping the members together as a unit in any position of adjustment.

10. In a composite gear adapted to slide upon a driving shaft, the combination of a pair of shaft engaging members, a screw for angularly adjusting the relative position of said members and a second screw for locking said members together as a unit in any position of adjustment.

In testimony whereof, I affix my signature.

CHARLES Y. KNIGHT.